United States Patent
Honjo et al.

(10) Patent No.: US 8,254,772 B2
(45) Date of Patent: Aug. 28, 2012

(54) IMAGING APPARATUS AND INTERCHANGEABLE LENS

(75) Inventors: Kenichi Honjo, Osaka (JP); Hideo Onishi, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/406,597

(22) Filed: Feb. 28, 2012

(65) Prior Publication Data
US 2012/0155845 A1  Jun. 21, 2012

Related U.S. Application Data

(63) Continuation of application No. 12/908,205, filed on Oct. 20, 2010, now Pat. No. 8,150,253.

(30) Foreign Application Priority Data

Oct. 22, 2009 (JP) ................................ 2009-243248

(51) Int. Cl.
G03B 13/34 (2006.01)
(52) U.S. Cl. .......................................... 396/87; 396/133
(58) Field of Classification Search .................... 396/85, 396/87, 133, 134; 359/697, 824
See application file for complete search history.

(56) References Cited

U.S. PATENT DOCUMENTS

| | | | |
|---|---|---|---|
| 5,208,535 A | 5/1993 | Nakayama et al. | |
| 5,430,375 A | 7/1995 | Inoue et al. | |
| 6,072,955 A | 6/2000 | Yokouchi et al. | 396/88 |
| 6,831,793 B2 | 12/2004 | Nakamura | 359/697 |
| 7,636,517 B2 | 12/2009 | Klinghult | 396/53 |
| 7,657,167 B2 | 2/2010 | Utz | 396/85 |
| 8,150,253 B2 * | 4/2012 | Honjo et al. | 396/87 |
| 2011/0097065 A1 * | 4/2011 | Honjo et al. | 396/85 |

FOREIGN PATENT DOCUMENTS

| | | |
|---|---|---|
| JP | 4-236302 | 8/1992 |
| JP | 5-224112 | 9/1993 |
| JP | 11-110045 | 4/1999 |
| JP | 2009-156982 | 7/2009 |

* cited by examiner

*Primary Examiner* — W. B. Perkey
(74) *Attorney, Agent, or Firm* — Panasonic Patent Center; Dhiren Odedra; Kerry Culpepper

(57) ABSTRACT

An imaging apparatus includes a plurality of lenses movable along an optical axis, a plurality of drivers configured to drive the plurality of lenses, respectively, and a synchronism loss detector configured to detect a loss of synchronism of one of the plurality of drivers. The one of the plurality of drivers is a driver that drives a lens which is heaviest in the plurality of lenses.

16 Claims, 8 Drawing Sheets

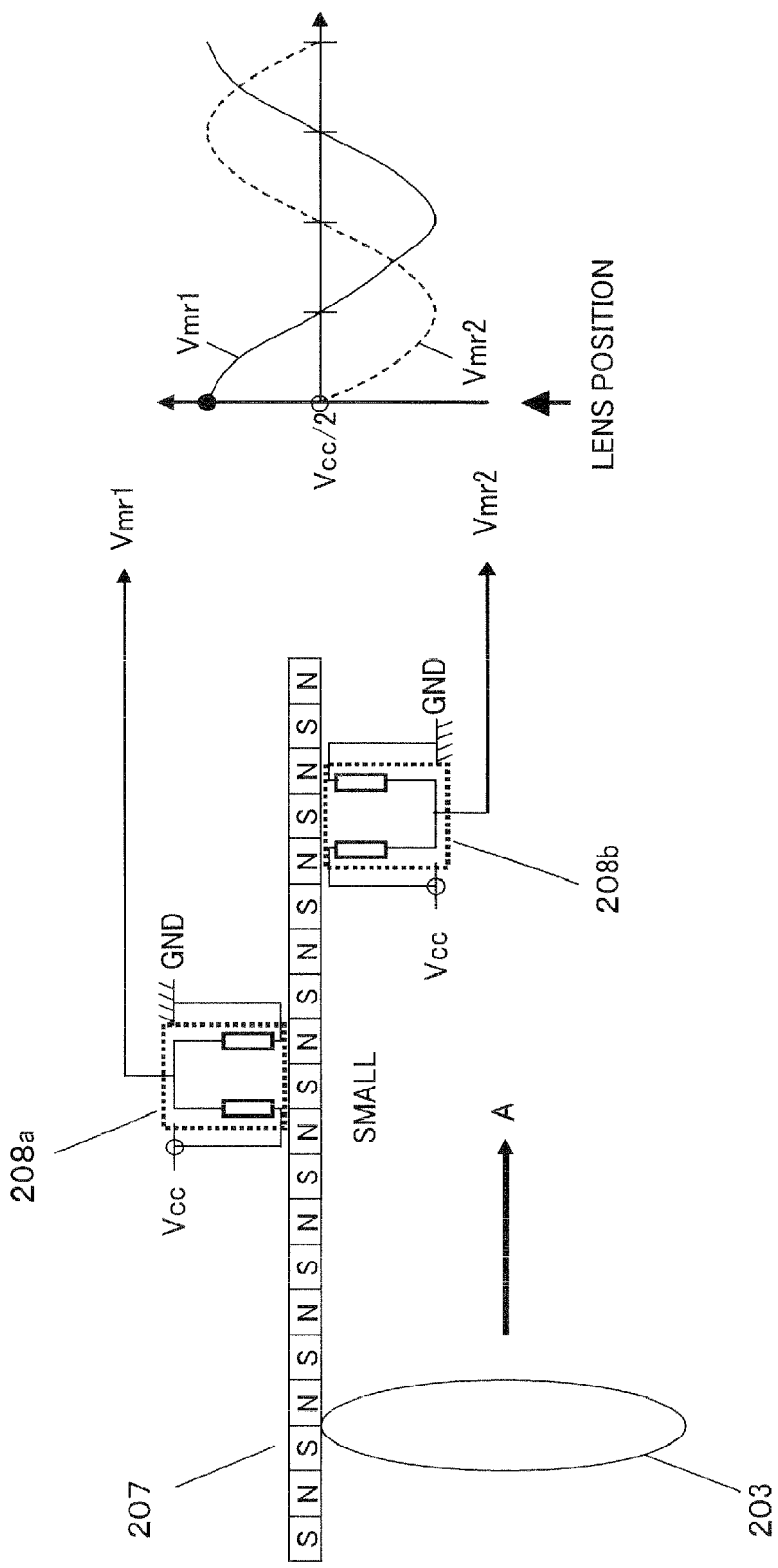

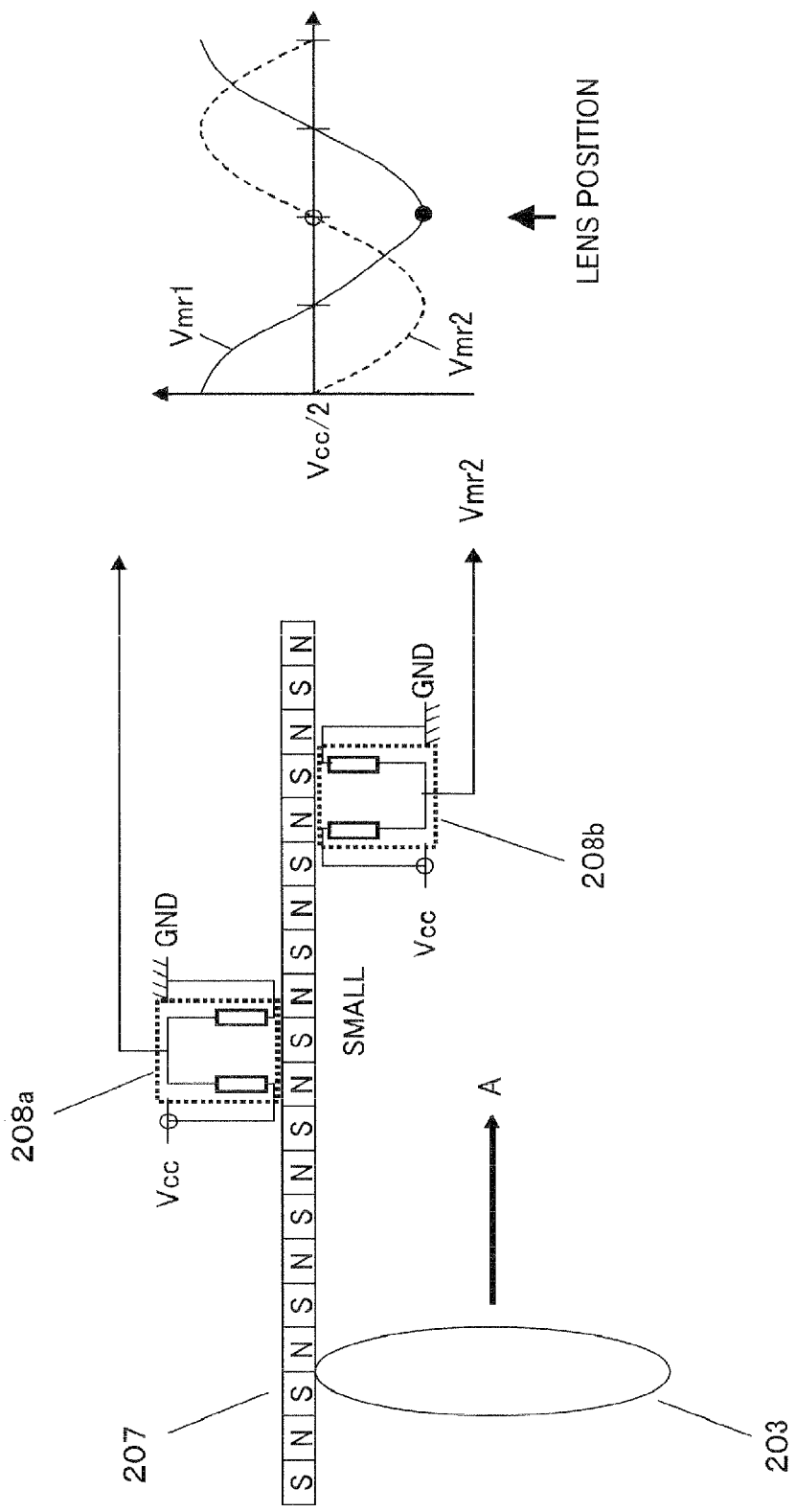

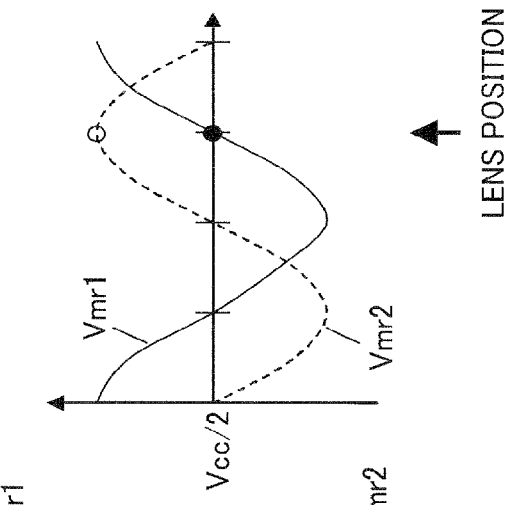
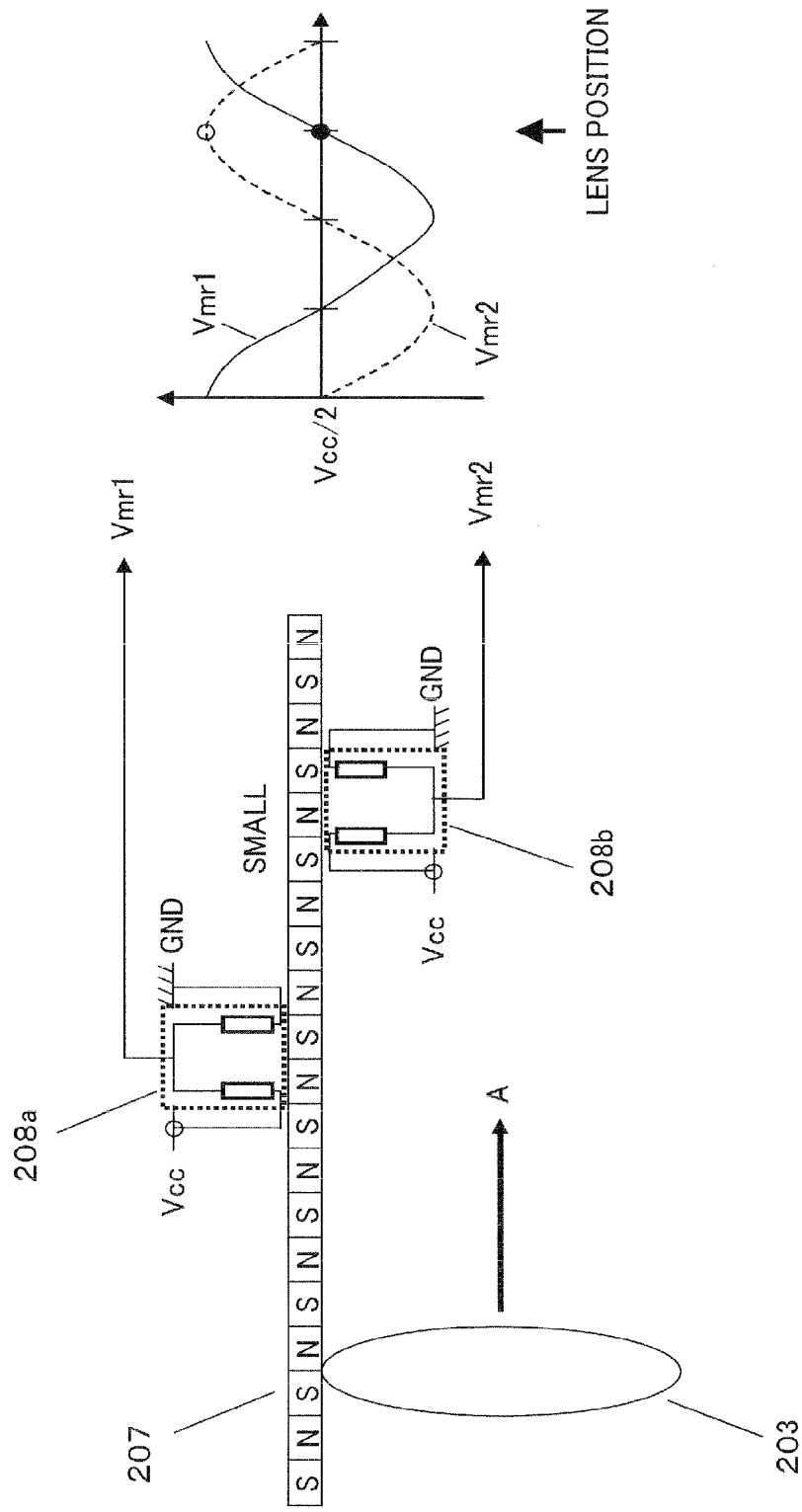

IMAGING APPARATUS AND INTERCHANGEABLE LENS

This application is a continuation of U.S. application Ser. No. 12/908,205, filed Oct. 20, 2010, now U.S. Pat. No. 8,150,253.

BACKGROUND

1. Technical Field

The technical field relates to an imaging apparatus and an interchangeable lens that include lenses movable in an optical axis direction. More particularly, the technical field relates to a technique for detecting a loss of synchronism of a motor that drives a lens in an imaging apparatus and an interchangeable lens.

2. Related Art

Conventionally, there exists an imaging apparatus that drives a focus lens by a motor. Such a movable lens is driven by, for example, a stepping motor. When the movable lens is driven by a stepping motor, there is a problem that, when an external shock is applied to the stepping motor, the stepping motor loses synchronism and thus cannot move the movable lens to a desired position. Accordingly, there is a need to, for example, detect a loss of synchronism of the stepping motor, and move the lens to a predetermined reference position when a loss of synchronism is detected.

For a prior art document pertaining to techniques for detecting a loss of synchronism of a stepping motor that drives a movable lens, there is JP 07-199033 A. A drive apparatus of a member for driving an optical system described in JP 07-199033A detects a loss of synchronism of a stepping motor, based on the loss of output pulses from a photointerrupter.

However, resolution of the photointerrupter is not so high, and thus a loss of synchronism of the stepping motor cannot be detected with high accuracy by the technique described in JP 07-199033 A.

Meanwhile, for a macro lens that allows for shooting with a focal length ranging from infinity to 1:1 close up, a plurality of focus lens groups are allowed to move independently of each other. With such a configuration, miniaturization can be achieved while the focal length is changed greatly.

In such a macro lens, when a loss of synchronism occurs in even one focus lens group, even if focus can be achieved, the macro lens cannot realize it's maximum potential. Hence, detection of a loss of synchronism becomes more important.

To solve the above problem, an imaging apparatus and an interchangeable lens are provided that are capable of detecting a loss of synchronism of a motor with high accuracy.

SUMMARY

In a first aspect, an imaging apparatus is provided that includes a plurality of lenses movable along an optical axis, a plurality of drivers configured to drive the plurality of lenses, respectively, and a synchronism loss detector configured to detect a loss of synchronism of one of the plurality of drivers. The one of the plurality of drivers is a driver that drives a lens which is heaviest in the plurality of lenses.

In a second aspect, an interchangeable lens mountable to a camera body is provided, that includes a plurality of lenses movable along an optical axis, a plurality of drivers configured to drive the plurality of lenses, respectively, and a synchronism loss detector configured to detect a loss of synchronism of one of the plurality of drivers. The one of the plurality of drivers is a driver that drives a lens that is heaviest in the plurality of lenses.

It is considered that a driver that drives the heaviest movable lens is most likely to cause a loss of synchronism when an external shock is applied thereto. Hence, according to the above aspects, detection of a loss of synchronism of a driver for a lens that is more likely to cause a loss of synchronism can be performed, enabling to detect a loss of synchronism with higher accuracy. In addition, since the heaviest lens is generally large and an optical influence exerted thereby is also large, by reliably detecting a loss of synchronism of the heaviest movable lens, an optical adverse influence caused by a loss of synchronism can be further reduced.

BRIEF DESCRIPTION OF DRAWINGS

FIGS. 3A and 3B are a first set of diagrams illustrating the periphery of a magnetoresistance sensor.

FIGS. 5A and 5B are a third set of diagrams illustrating the periphery of the magnetoresistance sensor.

FIGS. 6A and 6B are a fourth set of diagrams illustrating the periphery of the magnetoresistance sensor.

DETAILED DESCRIPTION OF PREFERRED EMBODIMENT

Preferred embodiment invention will be described below with reference to the accompanying drawings.

First Embodiment

1. Configuration

Figure 1:
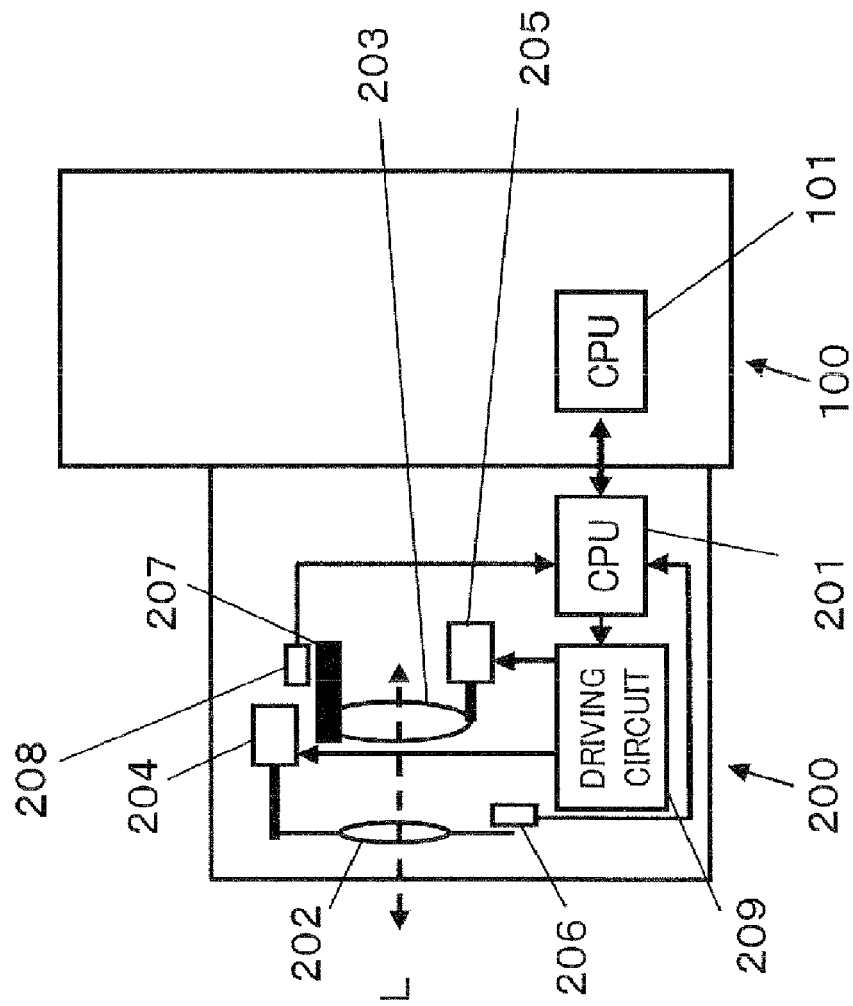
FIG. 1 is a block diagram showing a configuration of an imaging apparatus system according to one embodiment.

FIG. 1 is a block diagram showing a configuration of an imaging apparatus system according to an embodiment. The imaging apparatus system according to the embodiment is a lens-interchangeable digital still camera, and includes a camera body 100 and an interchangeable lens 200.

The interchangeable lens 200 is mechanically mounted to the camera body 100. When the interchangeable lens 200 is attached to the camera body 100, the camera body 100 and the interchangeable lens 200 are also electrically connected to each other. Specifically, power is supplied to the interchangeable lens 200 from the camera body 100 and communication between the camera body 100 and the interchangeable lens 200 is enabled. The camera body 100 sends an instruction to the interchangeable lens 200 to move movable lenses in the interchangeable lens 200. The interchangeable lens 200 notifies the camera body 100 of the state of the interchangeable lens 200.

The camera body 100 is mounted with a camera body CPU 101 for controlling each of units in the camera body 100 and the interchangeable lens 200. The camera body 100 includes an imaging device that converts an optical signal collected by the interchangeable lens 200 into an electrical signal, an image processing LSI that converts the electrical signal outputted from the imaging device into an image signal, a liquid crystal display that displays the image signal, and a recording medium that records the image signal, but these units are not shown in FIG. 1.

The interchangeable lens 200 is mounted with a lens CPU 201 for controlling each of units in the interchangeable lens 200 while communicating with the camera body CPU 101. The interchangeable lens 200 includes, as an optical system, a first focus lens 202 and a second focus lens 203. Although the optical system of the interchangeable lens 200 also includes other lenses, they are not shown in FIG. 1. Both the first focus lens 202 and the second focus lens 203 are movable along an optical axis L.

In the interchangeable lens 200 according to the present embodiment, the second focus lens 203 is larger and heavier than the first focus lens 202. Therefore, when the same shock is applied to them, a driver for the second focus lens 203 is more likely to cause a loss of synchronism than a driver for the first focus lens 202. Hence, in the present embodiment, detection of a loss of synchronism is performed only on the second focus lens 203 which is heavier. Note that although FIG. 1 shows that the first focus lens 202 and the second focus lens 203 are both configured by a single lens respectively, each of the lenses 202 and 203 may be composed of a lens group including a plurality of lenses.

The first focus lens 202 is driven in the optical axis L direction by a first stepping motor 204. A rack which is integrally provided on a frame body that holds the first focus lens 202 engages with a screw provided on a rotating shaft of the first stepping motor 204. With this configuration, when the first stepping motor 204 rotates, the first focus lens 202 moves along the optical axis L. It is detected whether the first focus lens 202 is in its initial position or not by detecting whether a part of the frame body that holds the first focus lens 202 shields a light receiver of a photointerrupter 206 or not.

The second focus lens 203 is driven along the optical axis L by a second stepping motor 205. A rack which is integrally provided on a frame body that holds the second focus lens 203 engages with a screw provided on a rotating shaft of the second stepping motor 205. Therefore, when the second stepping motor 205 rotates, the second focus lens 203 moves along the optical axis L. A movement of the second focus lens 203 is detected by a magnet 207 and a magnetoresistance sensor 208 which are integrally mounted on the frame body that holds the second focus lens 203.

The magnetoresistance sensor 208 also detects whether the second focus lens 203 is in its initial position or not. The magnetoresistance sensor 208 is a position detection sensor that uses a magnetoresistance effect in which the electrical resistance changes depending on the magnetic field strength. The magnetoresistance sensor 208 is, for example, an Anisotropic Magnetoresistance Sensor (AMR sensor) made of permalloy (Ni—Fe).

The first stepping motor 204 and the second stepping motor 205 are driven by a drive circuit 209. The lens CPU 201 controls the drive circuit 209 to move the first focus lens 202 and the second focus lens 203 to their respective desired positions, while communicating with the camera body CPU 101. The lens CPU 201 can determine whether the first focus lens 202 is at its initial position or not, from an output from the photointerrupter 206. In addition, the lens CPU 201 can determine a movement of the second focus lens 203 and whether the second focus lens 203 is at its initial position or not, from an output from the magnetoresistance sensor 208.

Note that the first stepping motor 204 and the second stepping motor 205 are examples of drivers for moving the first focus lens 202 and the second focus lens 203, respectively, and may be electromagnetic linear motors or other actuators.

2. Operation

2-1. Communication

Figure 2:
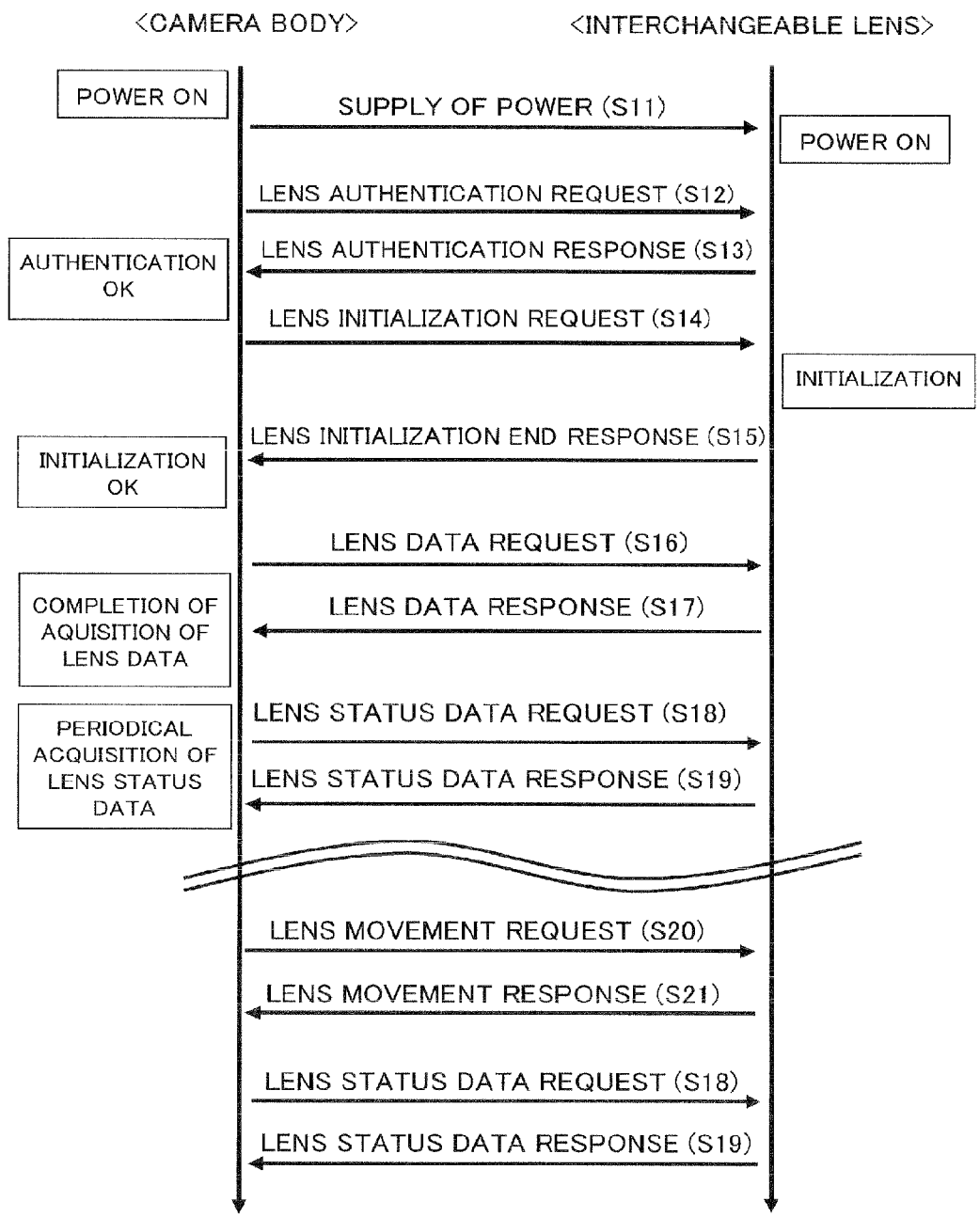
FIG. 2 is a diagram showing communication performed between a camera body and an interchangeable lens.
Figure 4B:
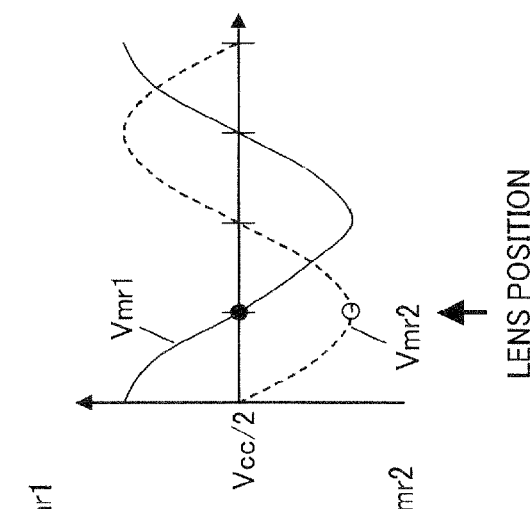
FIGS. 4A and 4B are a second set of diagrams illustrating the periphery of the magnetoresistance sensor.
Figure 4A:
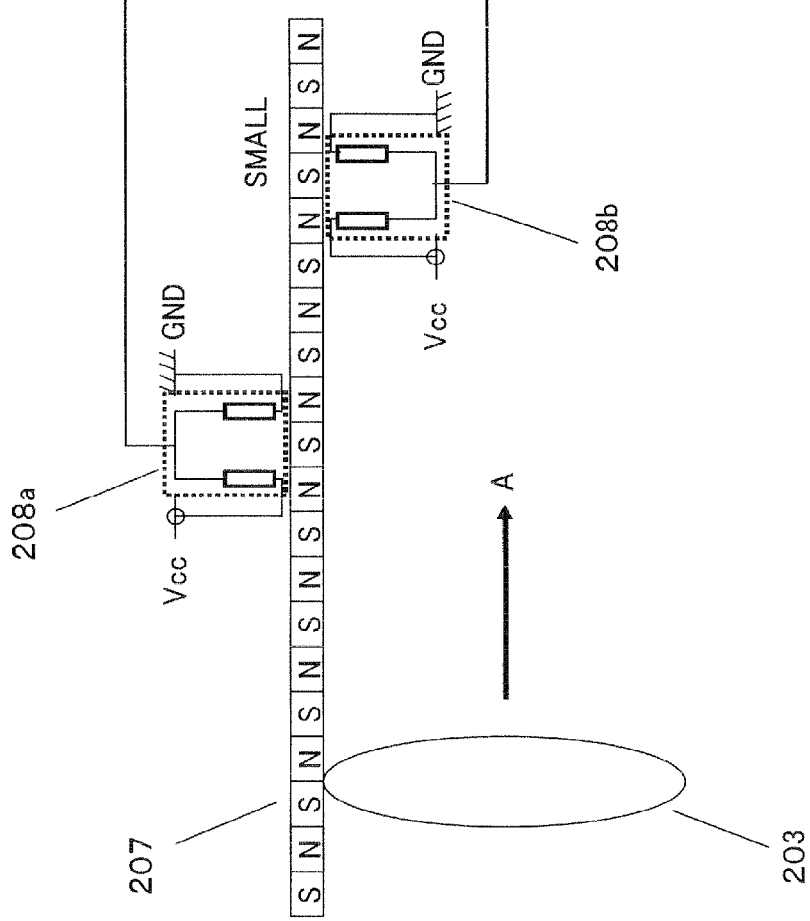

FIG. 2 is a diagram showing communication between the camera body 100 and the interchangeable lens 200. When the camera body 100 is turned on with the interchangeable lens 200 being mounted to the camera body 100, the camera body 100 supplies power to the interchangeable lens 200 (S11).

The camera body CPU 101 requests authentication information of the interchangeable lens 200 from the lens CPU 201 (S12). The authentication information of the interchangeable lens 200 includes information indicating whether the interchangeable lens 200 is mounted or not, and information indicating whether any accessory is further attached to the interchangeable lens 200 or not. The lens CPU 201 sends, as a response, authentication information of the interchangeable lens 200 to the camera body CPU 101 (S13).

The camera body CPU 101 requests the lens CPU 201 to perform an initialization operation (S14). In response to the request, the lens CPU 201 moves the first focus lens 202 and the second focus lens 203 to their respective initial positions. The initial positions serve as origins used to identify the positions of the first focus lens 202 and the second focus lens 203 after their movement. The lens CPU 201 also performs an initialization operation on other elements (not shown) included in the interchangeable lens 200, such as a diaphragm. When the initialization operation is completed, the lens CPU 201 sends a response indicating that the initialization operation has been completed, to the camera body CPU 101 (S15).

The camera body CPU 101 requests lens data from the lens CPU 201 (S16). The lens data is stored in a memory (not shown) in the interchangeable lens 200. The lens CPU 201 reads lens data from the memory and sends the lens data to the camera body CPU 201 (S17). The lens data includes information unique to the interchangeable lens 200, such as the name, F-number, and focal length of the interchangeable lens 200.

When the camera body CPU 101 obtains the lens data of the interchangeable lens 200 mounted to the camera body 100, the imaging system goes into a state where the imaging system is ready to perform shooting. After this, the camera body CPU 101 periodically requests lens state data indicating state of the interchangeable lens 200 from the lens CPU 201 (S18). The lens state data includes positional information of the first focus lens 202 and the second focus lens 203. The lens state data also includes information on the aperture value of the diaphragm (not shown), or the like. The lens CPU 201 sends lens state data to the camera body CPU 101 (S19).

The camera body CPU 101 requests the lens CPU 201 to move lens as required (S20). The lens movement request includes a request to move each of the first focus lens 202 and the second focus lens 203. The lens movement request also includes a request to change the aperture value, a request to move a zoom lens (not shown), or the like. In a response to the lens movement request, the lens CPU 201 sends information indicating that the process by the lens movement request is completed or is in progress, to the camera body CPU 101 (S21). The camera body CPU 101 controls the interchangeable lens 200 while checking the state of the interchangeable lens 200 based on the lens state data.

2-2. Magnetoresistance Sensor

FIGS. 3A and 3B to 6A and 6B are diagrams illustrating the function of the magnetoresistance sensor 208. FIGS. 3A, 4A, 5A, and 6A show a change in state when the second focus lens 203 is moving in a direction indicated by an arrow A in the drawings.

The second focus lens 203 and the magnet 207 are integrally provided. Therefore, when the second focus lens 203 moves in the direction indicated by the arrow A in the drawings, the magnet 207 also moves likewise. In the magnet 207, north poles and south poles are alternately formed at regular intervals. Note that the second stepping motor 205 that drives the second focus lens 203 is not shown.

The magnetoresistance sensor 208 includes a first magnetoresistance sensor 208a and a second magnetoresistance sensor 208b. Each of the first magnetoresistance sensor 208a and the second magnetoresistance sensor 208b includes two magnetoresistance elements.

In each of the first magnetoresistance sensor 208a and the second magnetoresistance sensor 208b, the two magnetoresistance elements are connected in series. One end of the two magnetoresistance elements connected in series is connected to a power supply Vcc and the other end is connected to a ground GND. In each of the first magnetoresistance sensor 208a and the second magnetoresistance sensor 208b, an output voltage is derived from a connecting point between the two magnetoresistance elements. In other words, the output voltage is a voltage obtained by dividing a power supply voltage with the resistances of the two magnetoresistance elements. The output voltage from the first magnetoresistance sensor 208a is Vmr1 and the output voltage from the second magnetoresistance sensor 208b is Vmr2.

In each of the first magnetoresistance sensor 208a and the second magnetoresistance sensor 208b, the spacing between the two magnetoresistance elements is three fourth of a pitch between north and south poles formed in the magnet 207, that is, three fourth of the distance between a pair of north pole and a south pole. The resistance of a magnetoresistance element changes depending on the positional relationship between a magnetic field generated by the north and south poles formed in the magnet 207 and the magnetoresistance element. Accordingly, the output voltage Vmr1 from the first magnetoresistance sensor 208a and the output voltage Vmr2 from the second magnetoresistance sensor 208b change.

FIGS. 3B, 4B, 5B, and 6B show the output voltage Vmr1 from the first magnetoresistance sensor 208a and the output voltage Vmr2 from the second magnetoresistance sensor 208b. The vertical axis represents voltage and the horizontal axis represents the position of the second focus lens 203. The spacing between the first magnetoresistance sensor 208a and the second magnetoresistance sensor 208b is determined such that the output voltage Vmr1 from the first magnetoresistance sensor 208a and the output voltage Vmr2 from the second magnetoresistance sensor 208b are shifted in phase by 90° with respect to each other. The lens CPU 201 can check a movement of the second focus lens 203 by observing the output voltage Vmr1 from the first magnetoresistance sensor 208a and the output voltage Vmr2 from the second magnetoresistance sensor 208b.

2-3. Autofocus Operation

The autofocus operation of the interchangeable lens 200 will be described with reference to FIG. 2.

The camera body CPU 101 controls the interchangeable lens 200 such that an optical signal collected by the interchangeable lens 200 is focused onto the imaging device. Specifically, the camera body CPU 101 requests the lens CPU 201 to move the lens (S20). According to the instruction from the camera body CPU 101, the lens CPU 201 moves the first focus lens 202 and the second focus lens 203. In a response to the lens movement request, the lens CPU 201 sends information indicating that the movement of the first focus lens 202 and the second focus lens 203 is completed or that the first focus lens 202 and the second focus lens 203 are moving, to the camera body CPU 101 (S21).

The camera body CPU 101 requests lens state data from the lens CPU 201 (S18). In a response to the request, the lens CPU 201 sends lens state data including positional information of the first focus lens 202 and the second focus lens 203, to the camera body CPU 101 (S19). By repeating the lens movement request (S20), the lens movement response (S21), the lens state data request (S18), and the lens state data response (S19), the camera body CPU 101 controls the interchangeable lens 200 such that an optical signal collected by the interchangeable lens 200 is focused onto the imaging device.

2-4. Synchronizm Loss Detection Process

The operation to detect a loss of synchronism of the second stepping motor 205 will be described.

2-4-1. Synchronizm Loss Detection—Principle

The principle of detection of a loss of synchronism of the second stepping motor 205 using an output from the magnetoresistance sensor 208 will be described.

Figure 7A:
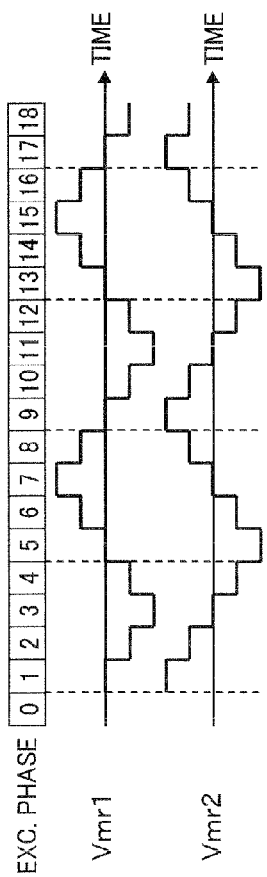
FIGS. 7A to 7C are diagrams showing an output voltage from the magnetoresistance sensor.
Figure 7B:
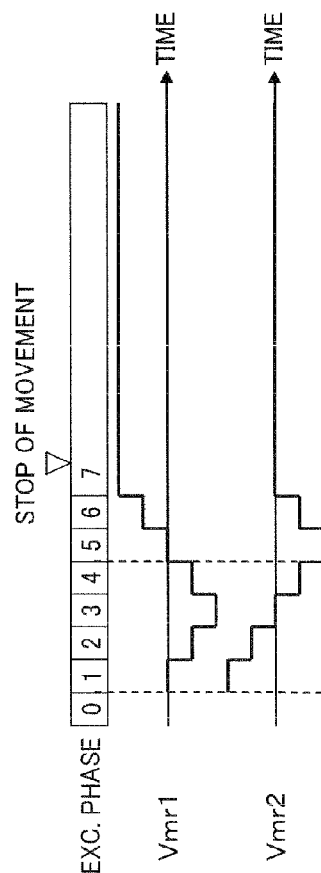
Figure 7C:
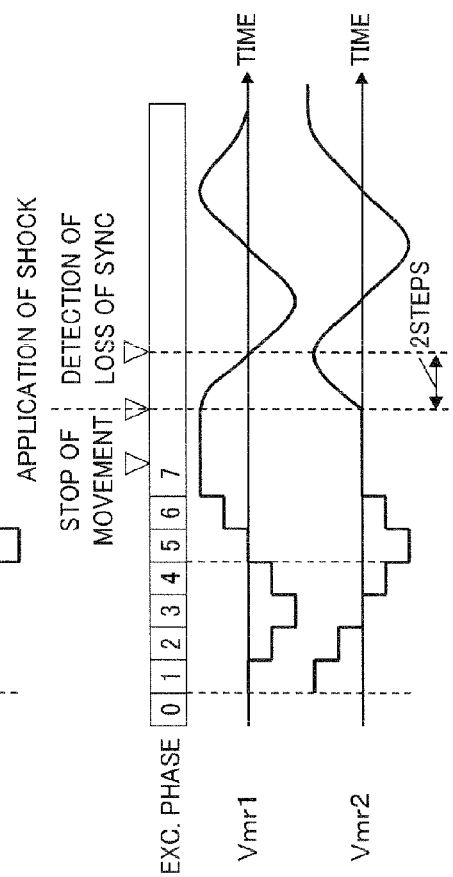

FIGS. 7A to 7C are diagrams showing an output voltage from the magnetoresistance sensor 208. FIG. 7A is a diagram showing an output voltage from the magnetoresistance sensor 208 during the movement of the second focus lens 203. FIG. 7B is a diagram showing an output voltage from the magnetoresistance sensor 208 after the movement of the second focus lens 203 is stopped. FIG. 7C is a diagram showing an output voltage from the magnetoresistance sensor 208 when a loss of synchronism occurs in the second stepping motor 205 since an external shock is applied to the second focus lens 203 after the movement of the second focus lens 203 is stopped. In all of the drawings, the horizontal axis represents time and the vertical axis represents voltage. An excitation phase of the second stepping motor 205 is represented with numbers at the top of FIGS. 7A to 7C. The second stepping motor 205 rotates 360° in eight steps.

As shown in FIG. 7A, during the movement of the second focus lens 203, both the output voltage Vmr1 from the first magnetoresistance sensor 208a and the output voltage Vmr2 from the second magnetoresistance sensor 208b change with eight steps of the excitation phase of the second stepping motor 205 as one cycle. The output voltage Vmr1 from the first magnetoresistance sensor 208a is shifted in phase by 90° from the output voltage Vmr2 from the second magnetoresistance sensor 208b.

As shown in FIG. 7B, when the movement of the second focus lens 203 is stopped, both the output voltage Vmr1 from the first magnetoresistance sensor 208a and the output voltage Vmr2 from the second magnetoresistance sensor 208b hold their respective output voltages obtained when the movement of the second focus lens 203 is stopped.

As shown in FIG. 7C, when a loss of synchronism occurs in the second stepping motor 205 since an external shock is applied to the second focus lens 203 after the movement of the second focus lens 203 is stopped, the output voltage Vmr1 from the first magnetoresistance sensor 208a and the output voltage Vmr2 from the second magnetoresistance sensor 208b change. When the output voltage Vmr1 from the first magnetoresistance sensor 208a and the output voltage Vmr2 from the second magnetoresistance sensor 208b change from voltages obtained when the movement is stopped to voltages obtained when the excitation phase of the second stepping motor 205 is shifted by two steps, the lens CPU 201 detects that a loss of synchronism occurs in the second stepping motor 205.

With reference to FIG. 7C, the case is described in which an external shock is applied to the second focus lens 203 after the movement of the second focus lens 203 is stopped, and thus a loss of synchronism occurs in the second stepping motor 205. However, even during the movement of the second focus lens 203, when the output voltage Vmr1 from the first magnetoresistance sensor 208a and the output voltage Vmr2 from the second magnetoresistance sensor 208b are shifted in an excitation phase of the second stepping motor 205, by two steps of the phase, from voltages which are subsequently expected, the occurrence of a loss of synchronism in the second stepping motor 205 can be detected.

2-4-2. Synchronizm Loss Detection—Flow

Figure 8:
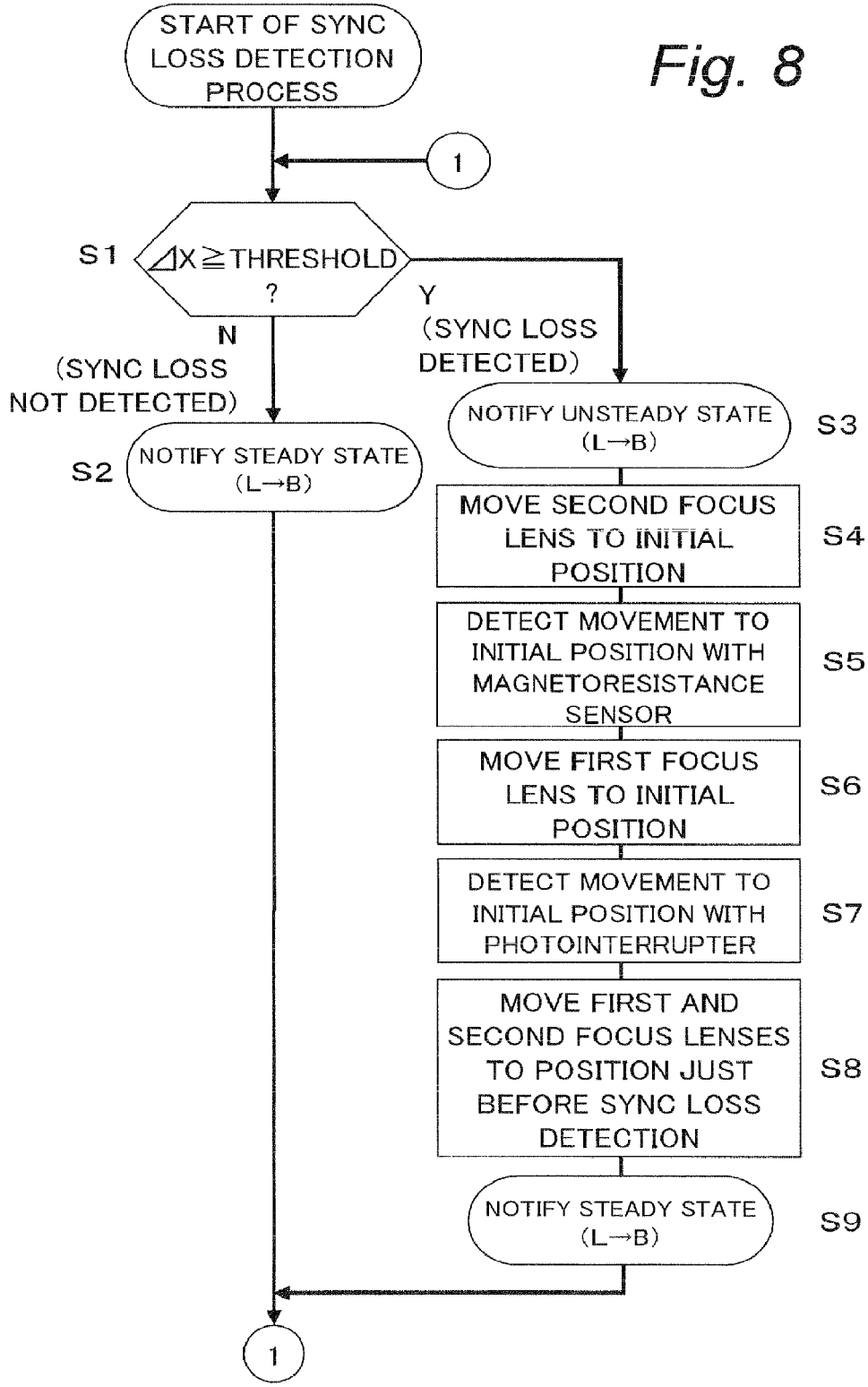
FIG. 8 is a flowchart illustrating a synchronism loss detection process.

A synchronism loss detection process will be described with reference to a flowchart in FIG. 8. FIG. 8 is a flowchart showing the process of the lens CPU 201 performed in a synchronism loss detection process. In FIG. 8 the "L" indicates the interchangeable lens 200 and the "B" indicates the camera body 100.

The lens CPU 201 compares the output voltage Vmr1 from the first magnetoresistance sensor 208a and the output voltage Vmr2 from the second magnetoresistance sensor 208b with their respective expected voltages (S1). If the voltage difference ΔX for at least one of the first magnetoresistance sensor 208a and the second magnetoresistance sensor 208b is greater than or equal to a threshold value, then the lens CPU 201 detects that a loss of synchronism occurs in the second stepping motor 205. The threshold value is set to a value equal to the amount of change in voltage for two steps of the excitation phase of the second stepping motor 205. On the other hand, if the voltage differences ΔX for both of the magnetoresistance sensors 208a and 208b are smaller than the threshold value, then the lens CPU 201 determines that a loss of synchronism does not occur in the second stepping motor 205.

When the lens CPU 201 determines that a loss of synchronism does not occur in the second stepping motor 205, the lens CPU 201 notifies the camera body CPU 101 of the fact that the interchangeable lens 200 is in a steady state, through a lens movement response or a lens state data response (S2). The camera body CPU 101 which is notified of the fact that the interchangeable lens 200 is in a steady state continues to control the interchangeable lens 200.

On the other hand, when the lens CPU 201 detects that a loss of synchronism occurs in the second stepping motor 205, the following process is performed. First, the lens CPU 201 notifies the camera body CPU 101 of the fact that the interchangeable lens 200 is not in a steady state, through a lens movement response or the lens state data response (S3). When the camera body CPU 101 is notified of the fact that the interchangeable lens 200 is not in a steady state, the camera body CPU 101 stops the control of the interchangeable lens 200 until it is notified of the fact that the interchangeable lens 200 is in a steady state.

The lens CPU 201 controls the drive circuit 209 to move the second focus lens 203 to its initial position (S4). The lens CPU 201 detects that the second focus lens 203 moves completely to its initial position, based on an output from the magnetoresistance sensor 208 (S5).

The lens CPU 201 controls the drive circuit 209 to move the first focus lens 202 to its initial position (S6). The lens CPU 201 detects that the first focus lens 202 moves completely to its initial position, based on an output from the photointerrupter 206 (S7).

When the first and second focus lenses 202 and 203 move to their respective initial positions completely, the lens CPU 201 controls the drive circuit 209 to move the first and second focus lenses 202 and 203 to their respective positions obtained immediately before the detection of the loss of synchronism (S8).

When the first and second focus lenses 202 and 203 move to their respective positions obtained immediately before the detection of the occurrence of the loss of synchronism, the lens CPU 201 notifies the camera body CPU 101 of the fact that the interchangeable lens 200 is in a steady state, through the lens movement response or the lens state data response (S9). When the camera body CPU 101 is notified of the fact that the interchangeable lens 200 is in a steady state, the camera body CPU 101 resumes the control of the interchangeable lens 200.

In short, when the interchangeable lens 200 detects a loss of synchronism, the interchangeable lens 200 notifies the camera body 100 of an unsteady state and stops receiving of instructions from the camera body 100. During the movement of the first and second focus lenses 202 and 203 to their respective initial positions, the interchangeable lens 200 continues to stop receiving of instructions from the camera body 100. Thereafter, when the first and second focus lenses 202 and 203 are moved to their respective positions obtained immediately before the detection of the loss of synchronism, the interchangeable lens 200 resumes receiving of instructions from the camera body 100.

3. Summary

As described above, an imaging apparatus system according to the present embodiment includes the first and second focus lenses 202 and 203 movable along an optical axis, the first and second stepping motors 204 and 205 that drive the first and second focus lenses 202 and 203, respectively, and a magnetoresistance sensor 208 that detects a loss of synchronism of one of the two stepping motors 204 and 205. One of the stepping motors that is provided with the magnetoresistance sensor 208 is the second stepping motor 204 that drives the second focus lens 203 which is the heaviest between the two lenses.

It is considered that a stepping motor that drives the heaviest movable lens is most likely to cause a loss of synchronism when an external shock is applied thereto. Hence, with the above configuration, detection of a loss of synchronism of a driver (stepping motor) for a lens that is more likely to cause a loss of synchronism can be performed, enabling to detect a loss of synchronism with higher accuracy. In addition, since the heaviest lens is generally large and an optical influence exerted thereby is also large, reliably detecting a loss of synchronism of the heaviest movable lens allows an optical adverse influence caused by a loss of synchronism to be further reduced.

In addition, in general, resolution of a magnetoresistance sensor is higher, by one digit, than resolution of a photointerrupter, and thus use of a magnetoresistance sensor as a synchronism loss detector allows detection of a loss of synchronism to be performed with higher accuracy.

Other Embodiments

An imaging apparatus system according to one embodiment is described above. However, the concept of the above embodiment can be applied not only to an imaging apparatus system including an interchangeable lens and a camera body but also to an imaging apparatus which a lens and a camera body are integrally formed. In this case, the imaging apparatus may include both a lens CPU 201 (lens controller) and a camera body CPU 101 (body controller) or one controller having both the function of the lens CPU 201 and the function of the body CPU 101.

The concept of the above embodiment can also be applied not only to an imaging apparatus system or an imaging apparatus that includes two movable lenses but also to an imaging apparatus system or an imaging apparatus that includes a plurality of (three or more) movable lenses. In this case, a loss of synchronism of a stepping motor (driver) that drives the heaviest movable lens among the plurality of movable lenses is detected. This is because it is considered that a stepping motor that drives the heaviest movable lens is most likely to cause a loss of synchronism when an external shock is applied thereto.

In the above embodiment, the lens CPU 201 detects a loss of synchronism of the second stepping motor 205 and controls the drive circuit 209 to move the second focus lens 203 to its initial position. However, the lens CPU 201 may detect a loss of synchronism of the drive circuit 209 and notify the camera body CPU 101 of the loss of synchronism, and the camera body CPU 101 may control the interchangeable lens 200 to move the second focus lens 203 to its initial position. Such control can also be similarly applied to an imaging apparatus in which a lens and a camera body are integrally formed, when the imaging apparatus includes a lens CPU 201 and a camera body CPU 101.

Although in the above embodiment the type of lens is a focus lens, the above concept can also be applied to a zoom lens. Specifically, when the optical system includes a plurality of lenses, a loss of synchronism of a driver (e.g., a stepping motor) that drives the heaviest lens in the lenses may be detected. This is because it is considered that a driver that drives the heaviest movable lens is most likely to cause a loss of synchronism when an external shock is applied thereto.

For example, when a zoom lens is composed of a plurality of lenses, a loss of synchronism of a driver that drives the heaviest zoom, lens may be detected. Alternatively, when a plurality of lenses include a lens composing (serving as) a zoom lens and a lens composing (serving as) a focus lens, a loss of synchronism of a driver that drives the heaviest lens between the lenses is detected. Alternatively, when the optical system includes a plurality of lenses that have both the zoom function and the focus function, a loss of synchronism of a driver that drives the heaviest lens in all lenses may be detected.

INDUSTRIAL APPLICABILITY

The embodiment enables to detect a loss of synchronism of a driver with high accuracy by means of a magnetoresistance sensor. Accordingly, the embodiment can be applied and is useful to an imaging apparatus system, such as a lens interchangeable digital camera, an imaging apparatus, such as a digital camera, and an interchangeable lens that composes an imaging apparatus system.

The invention claimed is:

1. An imaging apparatus comprising:
an optical system including a plurality of lenses;
a plurality of drivers configured to drive the respective lenses; and
a synchronism loss detector configured to detect a loss of synchronism of at least one of the plurality of drivers, the synchronism loss detector including a magnetoresistance sensor,
wherein the synchronism loss detector detects that a loss of synchronism occurs in at least one of the plurality of drivers, when a difference between the output of the magnetoresistance sensor and an output to be expected is larger than a predetermined threshold value.

2. The imaging apparatus according to claim 1, wherein the synchronism loss detector determines whether the difference between the output of the magnetoresistance sensor and an output to be expected is larger than a predetermined threshold value, when the driving by at least one of the plurality of drivers stops.

3. The imaging apparatus according to claim 1, wherein the plurality of lenses compose a focus lens.

4. The imaging apparatus according to claim 1, wherein the plurality of lenses compose a zoom lens.

5. The imaging apparatus according to claim 1, wherein the plurality of lenses include a lens composing a zoom lens and a lens composing a focus lens.

6. The imaging apparatus according to claim 1, further comprising a controller configured to control the plurality of drivers,
wherein when the synchronism loss detector detects a loss of synchronism, the controller controls the plurality of drivers to move the plurality of lenses to their respective initial positions.

7. The imaging apparatus according to claim 1, wherein
the synchronism loss detector includes at least two magnetoresistance sensors, and
the synchronism loss detector detects that a loss of synchronism occurs in at least one of drivers, when the difference between the output of the magnetoresistance sensor and an output to be expected is larger than a predetermined threshold value in either one of the at least two magnetoresistance sensors.

8. An interchangeable lens mountable to a camera body, comprising:
a plurality of lenses movable along an optical axis;
a plurality of drivers configured to drive the respective lenses; and
a synchronism loss detector configured to detect a loss of synchronism of at least one of the plurality of drivers, the synchronism loss detector including a magnetoresistance sensor,
wherein the synchronism loss detector detects that a loss of synchronism occurs in at least one of the plurality of drivers, when a difference between the output of the magnetoresistance sensor and an output to be expected is larger than a predetermined threshold value.

9. The interchangeable lens according to claim 8, wherein the synchronism loss detector determines whether the difference between the output of the magnetoresistance sensor and an output to be expected is larger than a predetermined threshold value, when the driving by at least one of the plurality of drivers stops.

10. The interchangeable lens according to claim 8, wherein the plurality of lenses compose a focus lens.

11. The interchangeable lens according to claim 8, wherein the plurality of lenses compose a zoom lens.

12. The interchangeable lens according to claim 8, wherein the plurality of lenses include a lens composing a zoom lens and a lens composing a focus lens.

13. The interchangeable lens according to claim 8, further comprising a controller configured to control the plurality of drivers,
wherein when the synchronism loss detector detects a loss of synchronism, the controller controls the plurality of drivers to move the plurality of lenses to their respective initial positions.

14. The interchangeable lens according to claim 13, wherein the controller controls the plurality of drivers based on an instruction received from the camera body, the controller stops receiving of the instruction from the camera body while the plurality of lenses moves to the initial positions due to detection of loss of synchronism by the synchronism loss detector.

15. The interchangeable lens according to claim 8 further comprising a controller configured to control the plurality of drivers based on an instruction received from the camera body, and
wherein the controller stops receiving of the instruction from the camera body when the synchronism loss detector detects the loss of synchronism.

16. The interchangeable lens according to claim 13, wherein
the synchronism loss detector includes at least two magnetoresistance sensors, and
the synchronism loss detector detects that a loss of synchronism occurs in at least one of drives, when the difference between the output of the magnetoresistance sensor and an output to be expected is larger than a predetermined threshold value in either one of the at least two magnetoresistance sensors.

* * * * *